(12) United States Patent
Edeler et al.

(10) Patent No.: US 7,558,607 B2
(45) Date of Patent: Jul. 7, 2009

(54) MOBILE ELECTRONIC DEVICE HAVING AUDIO CONNECTOR PROVIDING AN ANTENNA FUNCTION

(75) Inventors: Wolfgang Edeler, Vreden (DE); Axel Altenkirch, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/516,786

(22) PCT Filed: Jun. 12, 2002

(86) PCT No.: PCT/IB02/02158

§ 371 (c)(1),
(2), (4) Date: Dec. 3, 2004

(87) PCT Pub. No.: WO03/107548

PCT Pub. Date: Dec. 24, 2003

(65) Prior Publication Data

US 2005/0181844 A1 Aug. 18, 2005

(51) Int. Cl.
*H04M 1/00* (2006.01)
*H04B 1/38* (2006.01)
(52) U.S. Cl. .................................. 455/575.2; 375/219
(58) Field of Classification Search .............. 455/569.1, 455/575.2, 3.06, 469.1; 439/218; 331/76; 375/219; 381/27, 60, 86
See application file for complete search history.

(56) References Cited

U.S. PATENT DOCUMENTS

| | | | | |
|---|---|---|---|---|
| 4,369,521 A * | 1/1983 | Sawada | ...................... | 455/270 |
| 4,897,618 A * | 1/1990 | Svetanoff | ..................... | 331/76 |
| 5,361,405 A | 11/1994 | Ramsey | | |
| 6,203,344 B1 * | 3/2001 | Ito | .............................. | 439/218 |
| 6,430,217 B1 * | 8/2002 | Suzuki et al. | ............... | 375/219 |
| 6,646,449 B2 * | 11/2003 | Seppinen et al. | ............ | 324/624 |
| 6,961,591 B2 * | 11/2005 | Osano | ..................... | 455/569.1 |
| 7,054,610 B1 * | 5/2006 | Itoh et al. | .................... | 455/324 |

* cited by examiner

*Primary Examiner*—Charles N Appiah
*Assistant Examiner*—Kiet Doan
(74) *Attorney, Agent, or Firm*—Ware, Fressola, Van Der Sluys & Adolphson LLP

(57) ABSTRACT

The present invention discloses a mobile electronic device, having a radio receiver (28), an amplifier (24) and an audio connector (20) for connecting to a headphone (2). Said audio connector (2) comprises at least one first contact and at least one second contact, wherein said first contact is connected to ground and to said radio receiver (28), and said second contact is connected to said amplifier (24). The electronic device is characterized by a band-pass filter component (26) interconnected between said first contact and said radio receiver (28) so that only a predefined frequency range can pass to the radio receiver, preventing cross talk interference from transmitters operated in proximity.

13 Claims, 2 Drawing Sheets

MOBILE ELECTRONIC DEVICE HAVING AUDIO CONNECTOR PROVIDING AN ANTENNA FUNCTION

CROSS-REFERENCE TO RELATED APPLICATION

This application is the U.S. National Stage of International Application No. PCT/IB02/02158 filed Jun. 12, 2002 and published in English on Dec. 24, 2003 under International Publication No. WO 03/107548 A1.

BACKGROUND OF THE INVENTION

1. Technical Field

This invention relates to an improved radio receiving apparatus, and more particularly, to a mobile electronic device which includes headphones coupled by a cable to a receiving unit, wherein the cable is adapted to supply audio signals from the receiving unit to the headphones, and also to pick up and couple radio signals to the receiving unit.

2. Discussion of Related Art

The state of the art is provided by document U.S. Pat. No. 4,369,521. This document discloses an electric circuit to filter a radio signal from a ground line of a stereo headphone. The described circuit uses an inductor or a coil to block the radio frequencies (RF) from the output of the audio amplifiers and from ground, and a capacitor to block the audio frequencies from the radio frequency (RF) receiver circuit. Basically, U.S. Pat. No. 4,369,521 discloses a radio apparatus that is to be operated with headphones and that uses a frequency splitter with a single cable to provide an antenna and a headphone cable, for filtering out the RF signal from the used headphone cable signal ground. This solution is independent from the used cable type of the headphone. With the use of this document it is possible to use different headphones with different cable types e.g. cables with shielding from the signal wires (coaxial cables). Another advantage of this solution is that it is possible to use different headphones independent from the used cable type.

Other efforts to use e.g. a headphone cable as an antenna are known with balanced headphone cables. In some of these cases the signal is coupled out via capacitors from each of the four conductors of the balanced stereo output, because there is no common ground signal.

The two above approaches for using a headphone cable have the common feature that they have much RF loss, and further there is waste energy in the resistance of the inductor. Additionally this solution is not suitable for use with mobile terminal devices. Therefore, a new antenna concept is needed to overcome these problems.

DISCLOSURE OF INVENTION

It is desirable to improve the approach provided by the state of the art, for use in modem mobile devices.

It is further desirable to reduce the RF loss and the waste of audio power in the inductors of the audio ground connection.

It is further desirable to have an antenna that can be implemented in other external devices than just headphones.

According to a first embodiment of the present invention a mobile electronic device is provided comprising a radio receiver, an amplifier and an audio connector for connecting to a headphone, external loudspeakers or other external audio reproduction components of said electronic device. Said audio connector comprises at least one first contact and at least one second contact, i.e. the second contact of the connector is for connecting mono, stereo or even surround audio devices, like headphones, active loudspeakers a stereo system or the like. Said first contact is connected to ground and to said radio receiver, wherein the connection to ground is performed for grounding or eliminating audio frequencies via an electric element, such as an inductor or a coil, or a low pass filter. The mobile electronic device is characterized by a band-pass filter component interposed between said first contact and said radio receiver.

The use of a band-pass filter provides the advantage that the band-pass filter can be tuned to a small frequency range to transmit desired RF radio signals, whereas undesired mobile telephony frequencies and audio frequencies are blocked. Thereby, the RF damping compared to the state of the art is reduced, and therefore the yielded RF signal has a better signal to noise ratio. It is further advantageous that the inductor used to ground said audio signals can be designed smaller to provide less resistance for audio signals.

It may be noted that the audio connector is not restricted to the audio output of said radio receiver. The present invention is not restricted solely to headphones of radio apparatuses, but can be used e.g. in any multi purposed device utilizing a receiver to receive signals via a wireless radio connection. Instead of a headphone e.g. a connection cable to wired remote control, or e.g. a connection to a TV-goggle or the headset of a radio set or a walky-talky or the like may be utilized. The connection for audio frequencies to ground can also be made via a low pass filter or a band-pass filter for low frequencies, that is tuned to audio frequencies to further reduce the power loss in the audio path.

According to one preferred embodiment of the present invention said band-pass filter component comprises a capacitor connected between said first contact and ground. Compared to the state of the art, as described in U.S. Pat. No. 4,369,521 this capacitor forms a high frequency short circuit to ground. Together with the inductor, a band-pass filter is formed by short circuiting high frequencies and low frequencies.

Preferably, said band-pass filter component is an oscillating circuit composed of an inductor and a capacitor. The band-pass filter component can be embodied e.g. as a parallel oscillating circuit, to short all unwanted frequencies to ground (see FIG. 2). The band-pass filter component can be embodied e.g. as a serial oscillating circuit, connected in series to let all wanted frequencies pass to the receiver. The first solution needs a blocking capacitor, which may be economized in the second example, which requires an additional inductor for the ground connection of said audio signals.

Advantageously, said band-pass filter component is tuned to suppress all non-radio frequencies. Such a band-pass filter component ensures a suppression of all non radio frequencies, which helps to avoid any interference even of yet unconsidered sources of radio interference. The frequencies transmitted by band-pass filter component to said radio receiver are within the radio frequency range, and the suppressed frequencies comprise the mobile phone frequencies and audio frequencies. In the case that the parallel resonant circuit of the preceding paragraph is chosen, the circuit short-circuits the audio frequencies via said inductor economizing an additional low pass filter for said audio signals.

Preferably, said capacitor has a capacity of between 10 pF and 100 pF, preferably between 20 pF and 80 pF and more preferably between 30 pF and 60 pF. Accordingly, to cover a frequency range of approximately 70 to 140 MHz, wherein FM radio is transmitted, the respective inductor preferably has an impedance between 10 nH and 100 nH, more preferably between 20 and 60 and most preferably between 30 and 40 nH.

According to another embodiment of the present invention, the mobile electronic device further comprises a mobile telephone. The use of the invention with a mobile telephone is particularly of interest, as the spread of mobile phones in the last years will lead to an increased demand for multi purpose mobile telephones, as users will probably not accept to carry and maintain more than one electronic device.

It may be noted that said band-pass filter may be embodied as a passive filter as described in the preceding description, or may be embodied as an active filter, too. An example for such an active filter stage may be a digital signal processor (DSP), wherein the quality of the filtering can be increased at the expense of the resources of said mobile electronic device. This embodiment may best be used in case that e.g. a mobile telephone is used, and the telephone part of said mobile electronic device is turned off, and a powerful DSP is held ready.

Preferably, said radio receiver further comprises a television receiver. The provisioning of a television receiver broadens the spectrum of possible appliances of said multi purpose mobile electronic device. It may be noted that in the case of two or more receiver components within said multipurpose device, said band-pass component may comprise multiple band-pass filters for the frequency ranges of each receiver.

Preferably, said mobile electronic device further comprises a media player, and more preferably, said mobile electronic device further comprising a media recorder. A media player can be e.g. an audio cassette player or recorder, a CD or CD-R, DVD, DVD-R recorder, a hard disc system, or the like. The media can be an analog media such as audio or video cassettes. The media can be digital storage media such as floppy discs, hard discs solid state memories, magneto-optic storage media and the like.

Preferably, said audio connector comprises at least one third contact to provide additional connectivity to said audio out connector. The audio connector can comprise additional other contacts for increased connectivity. A third kind of contact in the connector may be used to provide a stereo audio output, to enable the user to hear music in stereo.

Preferably, said at least one third contact is connected to a mobile phone component of said mobile electronic device, to provide a headset functionality to said mobile phone within said mobile electronic device. It may be noted that in the case of radio receiver, integrated in a mobile phone or a walky-talky, the third contact may be utilized as a microphone contact for a headset.

Advantageously, at least one of said third contacts is connected to control components of said mobile electronic device, to provide a remote control functionality to the mobile electronic device. Such a remote control may also include a kind of basic remote control to operate a phone, a radio or audio player/recorder or other components of said mobile electronic device. Additional contacts may be used to provide additional connectivity for e.g. add-ons such as, chargers, remote controls, headsets, video goggles, cameras scanners, and the like.

Said audio output can be protected by a EMC low pass filter against irradiation, to prevent high frequency energy in the wiring between said connectors and said audio output. Such a high frequency radiation may cause errors in the function of said mobile electronic device and may further lead to feedback, cross talk interference, interference in the operation of said mobile electronic device, which may even lead to damages of components of said mobile electronic device.

Conveniently, said mobile electronic device further comprises a DC blocking capacitor interconnected between said first contact and said radio receiver. The capacitor is for blocking DC components from the RF input of said radio receiver. The capacitor is acting as a bias blocking and RF coupling capacitor. The blocking capacitor can be interconnected between the band-pass filter component and the antenna terminal of said radio receiver. The blocking capacitor can even be integrated in said band-pass filter component, and can be interconnected between elements of said band-pass filter component e.g. between the inductor and the capacitor (see FIG. 2). The capacity of the blocking capacitor should be chosen to be lager than the capacitor of the band-pass filter, whereby it can be guaranteed that the RF signal can pass the blocking capacitor without losses. Preferably, the blocking capacitor has a capacity being substantially 1.2 the capacity of the capacitor used in the band splitter.

With the use of the invention it is possible to use different headphones with different cable types e.g. cables with shielding from the signal wires (coaxial cables). Another advantage of this solution is that it is possible to use different headphones independently from the cable type used.

It may be noted that the expression "radio receiver" is used to describe any kind of receiving apparatus for electromagnetic waves, and may e.g. denote a classical analog tuner, or e.g. the receiver of walky-talky or e.g. a broadband scanner, a digital radio tuner a TV tuner or just anything capable of receiving and decoding or demodulating electromagnetic waves.

BRIEF DESCRIPTION OF THE DRAWINGS

In the following, the invention will be described in detail by referring to the enclosed drawings in which.

BEST MODE FOR CARRYING OUT THE INVENTION

Figure 1:
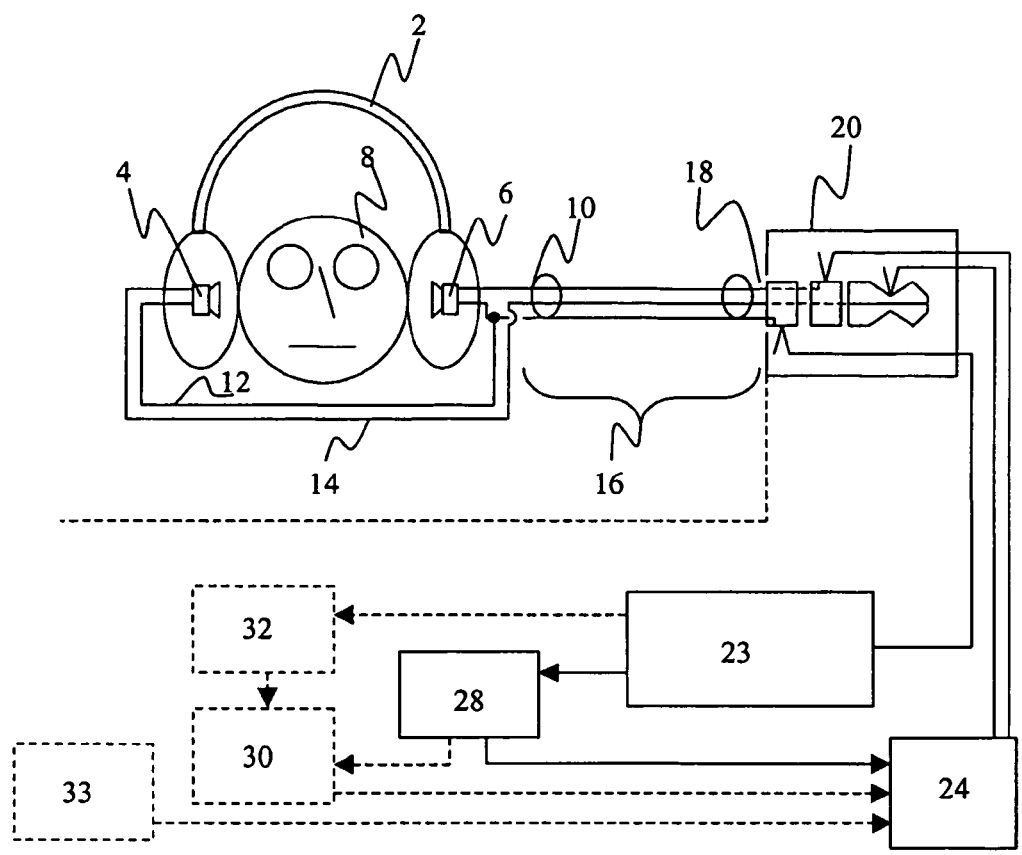
FIG. 1 is a block diagram of a mobile electronic device according to one embodiment of the present invention.

FIG. 1 is a block diagram of a mobile electronic device according to one preferred embodiment of the present invention. In this example, the mobile electronic device comprises basically a radio receiver component 28 and an audio amplifier 24. The audio amplifier 24 acts as an amplifier for the headphone 2. The headphone 2 is placed on the head of a user 8 and comprises two loudspeakers 4,6. In the example the headphone 2 is a standard headphone with e.g. a coaxial cable 16 and a standard 3.5 mm connector plug 18. The cable of headphone 2 comprises three conductors for left signal 10, right signal 12 and common ground 14. The connector plug 18 is inserted into the 3.5 mm connector 20 of the mobile electronic device. The two audio signals are connected to respective audio outputs of said audio amplifier 24. Said common ground cable is connected via a band splitter 23 for low frequencies to ground and for radio frequencies to the radio receiver 28.

The band splitter 23 short circuits the audio frequencies from the headphone 2 and the audio amplifier 24 via a (not depicted) low pass filter element to ground, therefore, the headphone 2 can be operated as usual. The radio receiver 28 is releasably connected to said audio amplifier 24. The radio receiver 28 can be any kind of radio receiver known in the art. With this minimum requirement said mobile electronic device can be operated as a conventional radio with a headphone cable antenna. The main advantage of said embodiment is that high frequency interference and cross talk interference can efficiently be suppressed. The use of a band-pass filter instead of a standard high-pass filter between common ground connector 14 and antenna input of the receiver 28 reduces the signal loss in the filter and thereby increases the signal strength in the antenna input of said receiver 28. Therefore, the sensitivity of said receiver may be reduced by using a cheaper model, or the gain of the radio signal can be used to increase the quality of the audio output. Additionally, with the spread of wireless technology in the environment like mobile telephones, wireless LAN (local area network), Bluetooth, baby-phones, radio controlled central locks for cars, the increase of electromagnetic pollution to be expected in the coming years will increase the need for better reception technology.

The mobile electronic device is not only restricted to radios, and the band splitter 23 may comprise elements to split a second frequency band from said ground line antenna 14. Thereby, an optional connection to e.g. a television receiver 32 may be incorporated in said mobile electronic device. Instead of a television receiver 32 any other radio wave receiving device or a component may be integrated in said mobile electronic device. The mobile electronic device may also include a player or a recorder 30 for received radio transmissions. A recorder 30 would enable a user e.g. to play a certain radio program while recording a received TV program. The mobile electronic device can further include other communication components like a walkie-talkie, a Bluetooth module, a mobile phone or the like. To prevent feedback interference, the band-pass filter can be tuned to filter out said communication frequencies.

The application is not simply restricted to standard headphones, but can be applied to headsets of mobile telephones. Such a head set may comprise a standard stereo headphone, with a mobile phone headset and e.g. a remote control for a radio, a phone and or a media player. The combination with a phone has the additional advantage that radio interference from the operation of said phone can be suppressed.

Figure 2:
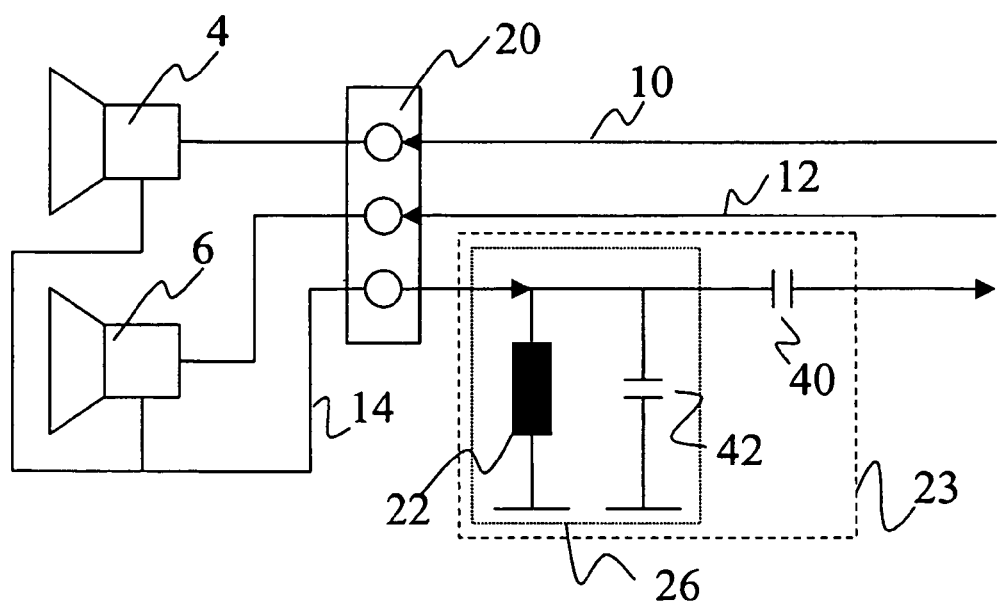
FIG. 2 is a circuit diagram of a mobile electronic device according to another embodiment of the present invention.

FIG. 2 is a circuit diagram of a mobile electronic device according to another embodiment of the present invention. In the circuit diagram only the relevant elements are depicted. As in FIG. 1 there are two loudspeakers 4 and 6, a headphone connector 20 embodied as a tomahawk system connector. The audio signal comes from headphone audio (1:0) (Signal: Ground) (indicated with the arrowheads at the connector) and is fed via band splitter 23. The inductor 22 provides the audio signal connection to ground (GND). The capacitor 42 forms together with said inductor 22 a resonant circuit which acts as a band-pass filter 26. The capacitor 40 is a bias blocking and RF coupling capacitor, and its value is selected to suppress all remaining audio signals not totally short circuited by said inductor or coil 22. Thereafter, the RF signal is connected to the FM radio antenna input (not shown).

Thereby, it is possible to use a coaxial cable for connecting a headphone, and to use the same cable as an antenna. The use of the inner conductor would result in loss of radio frequency (RF) signal due to shielding effects of the outer conductor. The outer conductor is the audio ground signal. A solution is needed to get the RF signal from the headphone cable, providing low audio signal loss for the audio path and blocking bias from the frequency modulation (FM) radio RF amplifier. One way could be a single coil or a single inductor to ground for audio signal as described in the state of the art. But this will result in a RF loss at the radio frequencies. To reduce the RF loss a parallel resonant circuit for the FM radio band is needed followed by a blocking capacitor for RF amplifier bias blocking from the RF input path.

With this embodiment the RF signal at the antenna input of the receiver is stronger. The inductor for short circuiting the audio signals can be made smaller, as if only a single inductor is used, and therefore the DC resistance of said inductor in the audio path is lower, leading to lower losses in the audio path. The band-pass filter also dampens the higher frequency mobile phone frequencies. Therefore a mobile phone can be operated in the proximity of said mobile electronic device without interference. This enables the system to be incorporated into a mobile telephone. This system enables the use of a radio and a mobile phone simultaneously.

Figure 3:
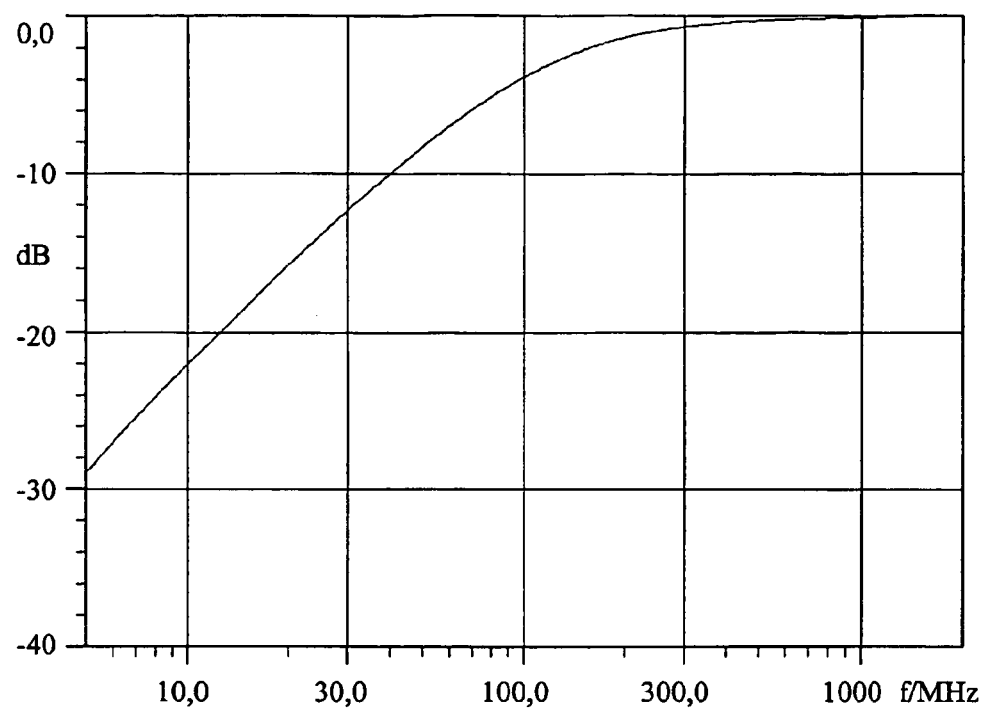
FIG. 3 is a characteristic curve of a filter element according to the state of the art.
Figure 4:
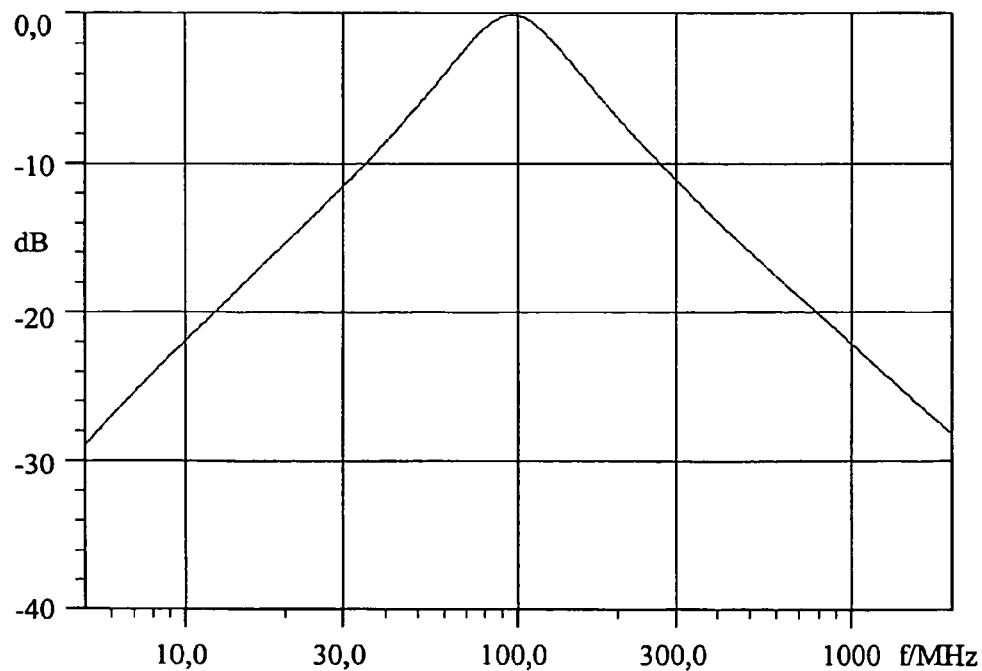
FIG. 4 is a characteristic curve of a filter element according to one embodiment of the present invention.

The best way to emphasize the advantages of the present invention is to compare the characteristic curve of a filter according to the state of the art (FIG. 3), and the characteristic curve of a filter according to one embodiment of the present invention (FIG. 4). In FIG. 3 the inductor dampens the RF signal at 100 MHz with approximately 3 to 3.5 dB. In the case of a band-pass filter according to FIG. 2, wherein the inductor 22 has 33 nH, the capacitor 42 has 82 pF and the blocking capacitor 40 has 100 pF, the filter is tuned to 96.7 MHz, and a 100 MHz signal can pass the filter nearly without any damping. See FIG. 4: nearly 0 dB are achieved at 100 MHz in the characteristic curve, that is the RF signal can be separated from the ground line without detectable losses in the signal strength.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. Mobile electronic device, comprising:
    a radio receiver,
    an amplifier, and
    an audio connector for connecting to an audio reproduction component, said audio connector providing an antenna function through a connected audio reproduction component,
    wherein said audio connector comprises at least one first contact and at least one second contact,
    wherein said first contact is connected to ground and to an antenna input of said radio receiver, and said second contact is connected to said amplifier,
    wherein a band-pass filter component is interconnected between the first contact and said radio receiver,
    wherein the connection via the band-pass filter component is configured to allow a radio signal to propagate from the first contact to said antenna input of said radio receiver, if the radio signal has a frequency lying within one of the frequency ranges of 535 kHz to 1.7 MHz, 3 MHz to 30 MHz or 70 MHz to 140 MHz, and
    wherein said audio connector comprises at least one third contact connected to a component of said electronic device and said third contact is connected to control components of said mobile electronic device, to provide a remote control functionality for the mobile electronic device.

2. Mobile electronic device according to claim 1, wherein said capacitor is connected between said first contact and ground.

3. Mobile electronic device according to claim 2, wherein said capacitor has a capacity between 10 pF and 100 pF.

4. Mobile electronic device according to claim 1, wherein said device comprises a mobile telephone.

5. Mobile electronic device according to claim 1, wherein said radio receiver further comprises a television receiver.

6. Mobile electronic device according to claim 1, further comprising a media player.

7. Mobile electronic device according to claim 6, wherein said media player includes a media recorder.

8. Mobile electronic device according to claim 1, wherein said third contact is connected to a mobile phone component of said mobile electronic device, to provide a headset for the mobile phone within said mobile electronic device.

9. Mobile electronic device according to claim 8, wherein said third contact is connected to control components of said mobile electronic device, to provide a remote control functionality for the mobile electronic device.

10. Mobile electronic device according to claim 1, wherein said third contact is connected to a mobile phone component of said mobile electronic device, to provide a headset for the mobile phone within said mobile electronic device.

11. Mobile electronic device according to claim 1, further comprising a DC blocking capacitor interconnected between said first contact and said radio receiver.

12. Mobile electronic device according to claim 1, wherein said capacitor has a capacity between 10 pF and 100 pF.

13. Mobile electronic device, comprising:
a first module for receiving a radio signal;
a second module for amplifying; and
a connection module for connecting to an audio reproduction component, said connection module providing an antenna function through a connected audio reproduction component;
wherein said connection module comprises at least one first contact module and at least one second contact module;
wherein said first contact module is connected to ground and to an antenna input of said first module, and said second contact module is connected to said second module,
wherein a module for transmitting and suppressing frequencies is interconnected between said first contact module and said first module;
wherein the connection via said module for transmitting and suppressing frequencies is configured to allow a radio signal to propagate from said first contact module to said antenna input of said first module, if the radio signal has a frequency lying within one of the frequency ranges of 535 kHz to 1.7 MHz, 3 MHz to 30 MHz or 70 MHz to 140 MHz, and
wherein said connection module comprises at least one third contact module connected to a component of said electronic device and said third contact module is connected to control components of said mobile electronic device, to provide a remote control functionality for the mobile electronic device.

* * * * *